Figures 1, 5:
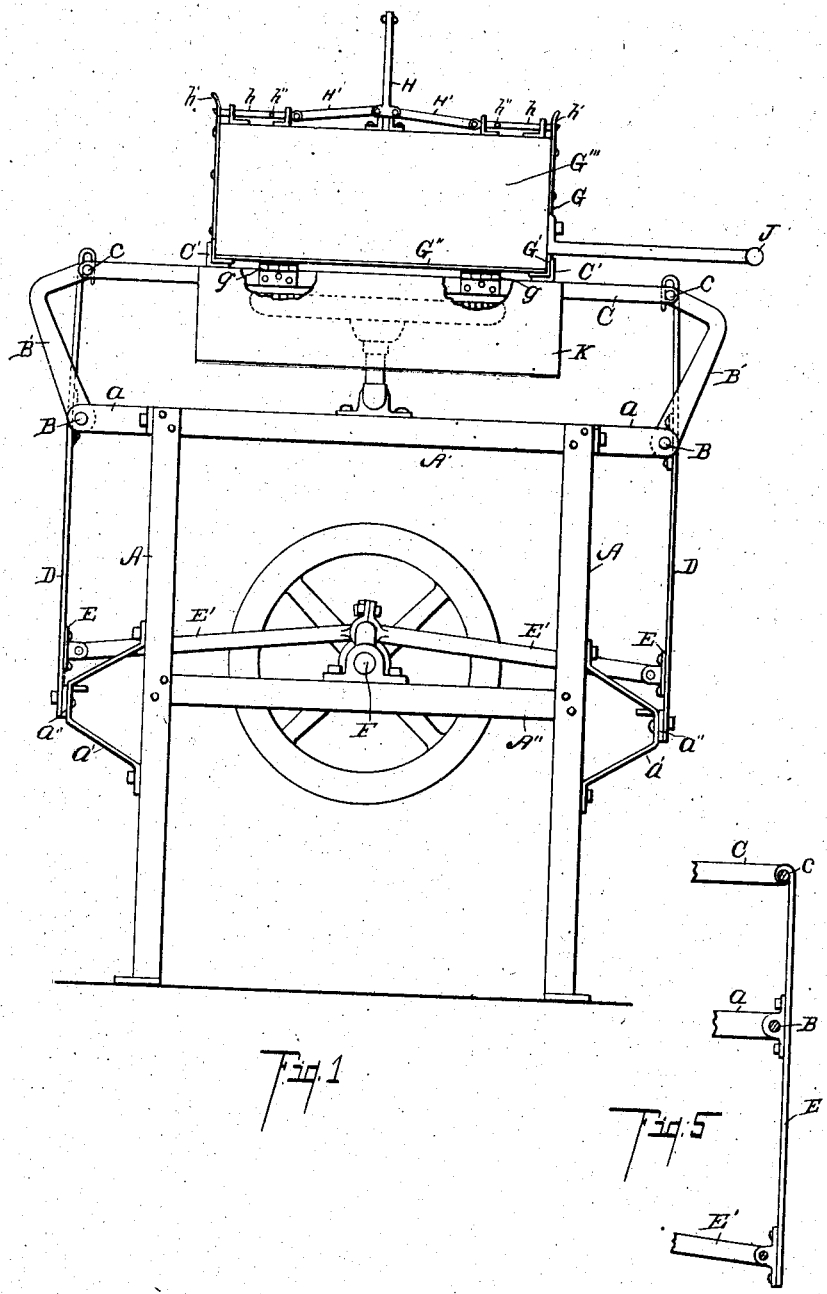

No. 833,899. PATENTED OCT. 23, 1906.
W. RYAN.
CORN POPPING-MACHINE.
APPLICATION FILED AUG. 7, 1905.

2 SHEETS—SHEET 1.

Witnesses:
Amelia J. Alber
Ethel A. Seller Bradford

Inventor,
William Ryan
By Chappell Earl
Att'ys

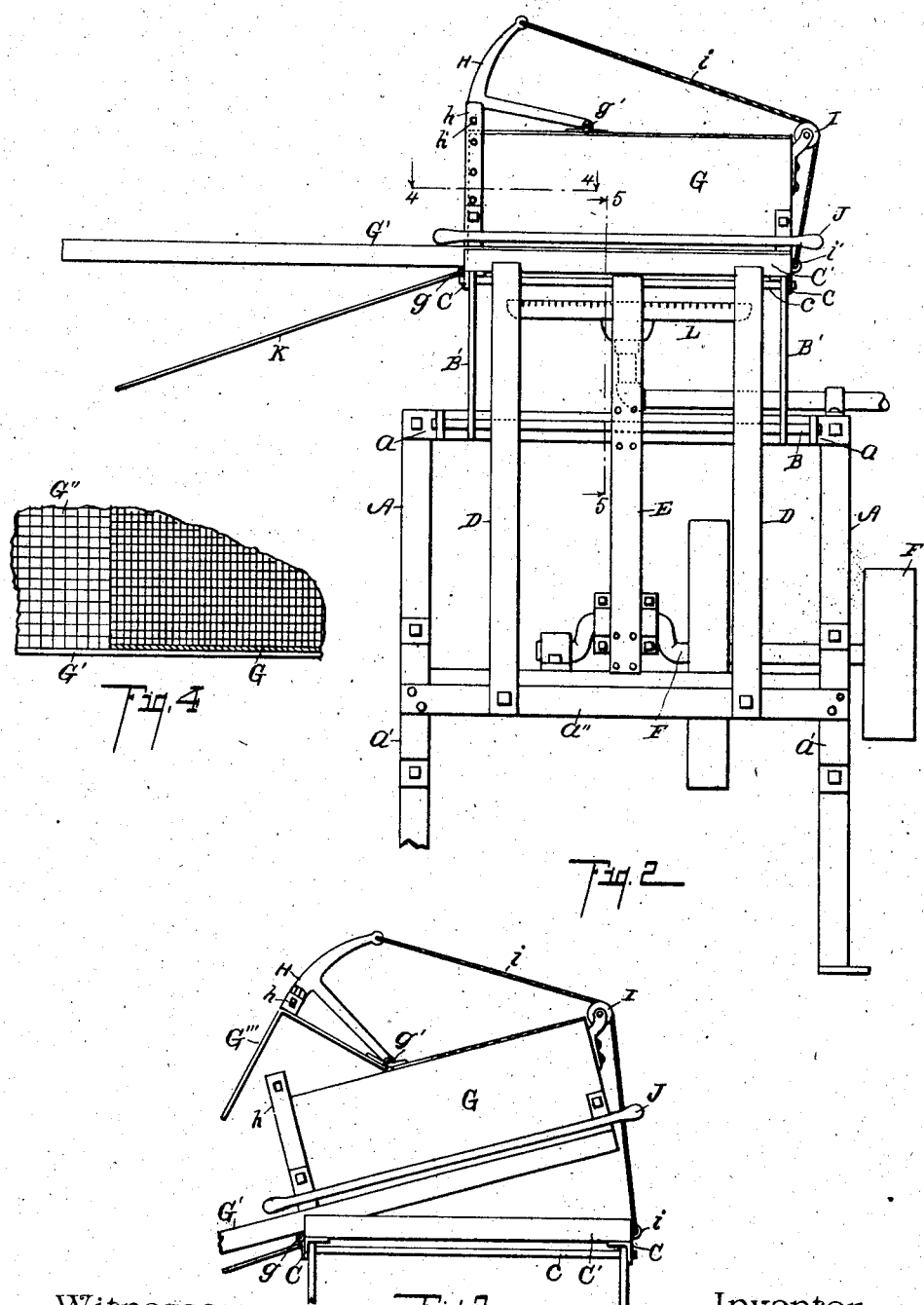

UNITED STATES PATENT OFFICE.

WILLIAM RYAN, OF CHICAGO, ILLINOIS.

CORN-POPPING MACHINE.

No. 833,899.          Specification of Letters Patent.          Patented Oct. 23, 1906.

Application filed August 7, 1905. Serial No. 273,210.

*To all whom it may concern:*

Be it known that I, WILLIAM RYAN, a citizen of the United States, residing at Chicago, in the county of Cook and State of Illinois, have invented certain new and useful Improvements in Corn-Popping Machines, of which the following is a specification.

This invention relates to improvements in corn-popping machines.

The objects of this invention are, first, to provide an improved corn-popping machine by which the liability of burning the corn is reduced to a minimum; second, to provide an improved corn-popping machine which is of very large capacity in proportion to size and easy to operate; third, to provide an improved corn-popping machine embodying these advantages which is simple in structure and economical to manufacture.

Further objects and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which—

Figure 1 is a front elevation view of my improved corn-popping machine, portions being broken away to show structural details. Fig. 2 is a detail side elevation view of my improved corn-popping machine looking from the right of Fig. 1. Fig. 3 is a detail side elevation view showing the popper-box adjusted to its discharging position. Fig. 4 is an enlarged detail view of the popper-box, taken on a line corresponding to line 4 4 of Fig. 2. Fig. 5 is a detail vertical sectional view taken on a line corresponding to line 5 5 of Fig. 2.

In the drawings similar letters of reference refer to similar parts throughout the several views, and the sectional views are taken looking in the direction of the little arrows at the ends of the section-lines.

Referring to the drawings, the main or supporting frame is preferably made up of standards A, having cross-pieces A' A'' rigidly secured thereto. A popper-box-carrying frame C is provided. The popper-box G is hinged at its forward end to the frame C. The frame C is supported by the arms B'. The arms B' are pivotally mounted on the rods B at their lower ends, and their upper ends are pivotally connected to the frame C by the rods c. The pivot-rods B are supported by the brackets a. A pair of angle-iron rests C' are secured to the popper-box-carrying frame C in position to receive and hold the popper-box.

The popper-box G is preferably made with sheet-metal sides and with a screen-bottom. A portion of the top of the popper-box is also covered with screen. The popper-box door G''' is hinged at g and is adapted to open upwardly. The side rails G' of the popper-box are extended forward beyond the box to form a support for the screen G'' for screening the popped corn as it is dumped from the box. A chute K is arranged under this screen to deliver the screenings away from the machine into a proper receptacle. A latch is provided for retaining the door in its closed position. This latch consists of a pair of sliding bolts $h$, which are adapted to engage the upward-projecting catches $h'$, secured to the side walls of the popper-box. (See Figs. 1 and 3.) The bolts $h$ are arranged through suitable guides on the popper-box door and are connected by links H' to the latch-lever H, which is pivoted at $g'$. By lifting this latch-lever the bolts are first withdrawn, and then the door is opened. Stops $h''$ are arranged on the bolts to limit their inward movement. The latch-lever H is connected by a cable $i$, which is arranged over the guide-pulley I on the rear of the popper-box, to the frame C. When the popper-box G is tilted to dump the same, the latch-arm H is lifted, first withdrawing the latch-bolts from their catches and then lifting the door to allow the discharge of the popped corn. A handle J is provided for tilting the box. The position of the box when tilted is illustrated in Fig. 3.

A vibratory movement is imparted to the popper-box by means of the springs E, which are secured on the cross-piece $a''$ at their lower ends and connected to the cross-rod $c$ of the popper-box-carrying frame at their upper ends. These springs are connected by means of the rods E' to the crank-shaft F. The cross-pieces $a''$ are preferably mounted on brackets $a'$, projecting from the sides of the main frame.

A pair of vibrating springs D are arranged on each side of the machine to assist in vibrating the popper-box. These springs are secured to the cross-pieces $a''$ at their lower ends; but their upper ends are hooked over the cross-rods $c$ of the popper-box frame C. This when in operation keeps the popper-box vibrating in a manner that thoroughly agitates the corn, keeping it in motion, so that liability of its catching fire is reduced to a minimum.

While I prefer to operate the machine by power, it is evident that it can be operated by hand, either by a suitable crank on the crankshaft or by means of the handle J.

Any suitable burner, as L, may be arranged beneath the popper-box, or a charcoal box or other heating means can be located under the same, as may be desired.

The operation of the machine keeps the corn in the popper-box thoroughly agitated. When done, it is only necessary to tilt the popper-box on its hinges $b$, which open the door, and the popped corn passes out over the screen $G''$, thereby screening it. The screened corn may be delivered into one receptacle and the screenings into another, the latter being collected from the screen $G''$ by the chute K. When the popper-box is allowed to drop into its normal position, the door is automatically closed and locked.

The structure is comparatively simple and economical to manufacture and is very convenient to use. It may be of comparatively small size and still of very large capacity on account of its convenience in use and the thorough agitation of the corn in the popper-box.

I have illustrated and described my improved popper-box in detail in the form preferred by me on account of its structural simplicity, economy, and convenience in use, although I am aware that it is capable of considerable variation in structural details without departing from my invention.

Having thus described my invention, what I claim as new, and desire to secure by Letters Patent, is—

1. The combination of a main supporting-frame; a popper-box-carrying frame; pivoted supporting-arms therefor; a popper-box hinged to said carrying-frame at its forward end; forwardly-projecting side rails for said box; an upwardly-opening door for said box, arranged at its hinged end; a latch for said door, consisting of a pair of sliding bolts, a pivoted latch-lever, and links connecting said bolts to said lever; a pulley mounted to the rear of said door; a cord arranged over said pulley secured to said latch-lever and to said box-carrying frame; angle-iron rests for said popper-box arranged on said carrying-frame; a screen carried by the forwardly-projecting side rails of said popper-box, for screening the corn as it is delivered therefrom; a chute arranged beneath said screen; a crank-shaft; springs mounted on said main frame and connected to said popper-box-carrying frame; connecting-rods for said springs and said crank-shaft; and vibrating springs mounted on said main frame and connected to said popper-box-carrying frame, for the purpose specified.

2. The combination of a main supporting-frame; a popper-box-carrying frame; pivoted supporting-arms therefor; a popper-box hinged to said carrying-frame at its forward end; an upwardly-opening door for said box, arranged at its hinged end; a latch for said door, consisting of a pair of sliding bolts, a pivoted latch-lever, links connecting said bolts to said lever; a pulley mounted to the rear of said door; a cord arranged over said pulley secured to said latch-lever and to said box-carrying frame; angle-iron rests for said popper-box arranged on said carrying-frame; a crank-shaft; springs mounted on said main frame and connected to said popper-box-carrying frame; connecting-rods for said springs and crank-shaft; and vibrating springs mounted on said main frame and connected to said popper-box-carrying frame, for the purpose specified.

3. The combination of a main supporting-frame; a popper-box-carrying frame; pivoted supporting-arms therefor; a popper-box hinged to said carrying-frame at its forward end; forwardly-projecting side rails for said box; an upwardly-opening door for said box, arranged at its hinged end; a latch for said door, consisting of a pair of sliding bolts, a pivoted latch-lever, and links connecting said bolts to said lever; a pulley mounted to the rear of said door; a cord arranged over said pulley secured to said latch-lever and to said box-carrying frame; a screen carried by the forwardly-projecting side rails of said popper-box for screening the corn as it is delivered therefrom; a chute arranged beneath said screen; a crank-shaft; springs mounted on said main frame and connected to said popper-box-carrying frame; connecting-rods for said springs and said crank-shaft; and vibrating springs mounted on said main frame and connected to said popper-box-carrying frame, for the purpose specified.

4. The combination of a main supporting-frame; a popper-box-carrying frame; pivoted supporting-arms therefor; a popper-box hinged to said carrying-frame at its forward end; an upwardly-opening door for said box arranged at its hinged end; a latch for said door, consisting of a pair of sliding bolts, a pivoted latch-lever, and links connecting said bolts to said lever; a pulley mounted to the rear of said door; a cord arranged over said pulley secured to said latch-lever and to said box-carrying frame; a crank-shaft; springs mounted on said main frame and connected to said popper-box-carrying frame; connecting-rods for said springs and crank-shaft; and vibrating springs mounted on said main frame and connected to said popper-box-carrying frame, for the purpose specified.

5. The combination of a main supporting-frame; a popper-box-carrying frame; pivoted supporting-arms therefor; a popper-box hinged to said carrying-frame at its forward end; forwardly-projecting side rails for said box; an upwardly-opening door for said box, arranged at its hinged end; a latch for said door, consisting of a pair of sliding bolts, a pivoted latch-lever, and links connecting said bolts to said lever; a pulley mounted to the rear of said door; a cord arranged over said pulley secured to said latch-lever and to said box-carrying frame; angle-iron rests for said popper-box arranged on said carrying-frame; a screen carried by the forwardly-projecting side rails of said popper-box, for screening the corn as it is delivered therefrom; a chute arranged beneath said screen; a crank-shaft; springs mounted on said main frame and connected to said popper-box-carrying frame; and connecting-rods for said springs and said crank-shaft, for the purpose specified.

6. The combination of a main supporting-frame; a popper-box-carrying frame; pivoted supporting-arms therefor; a popper-box hinged to said carrying-frame at its forward end; an upwardly-opening door for said box arranged at its hinged end; a latch for said door, consisting of a pair of sliding bolts, a pivoted latch-lever, and links connecting said bolts to said lever; a pulley mounted to the rear of said door; a cord arranged over said pulley secured to said latch-lever and to said box-carrying frame; angle-iron rests for said popper-box arranged on said carrying-frame; a crank-shaft; springs mounted on said main frame and connected to said popper-box-carrying frame; and connecting-rods for said springs and crank-shaft, for the purpose specified.

7. The combination of a main supporting-frame; a popper-box-carrying frame; pivoted supporting-arms therefor; a popper-box hinged to said carrying-frame at its forward end; forwardly-projecting side rails for said box; a door for said box arranged at its hinged end; angle-iron rests for said popper-box arranged on said carrying-frame; a screen carried by the forwardly-projecting side rails of said popper-box for screening the corn as it is delivered therefrom; a chute arranged beneath said screen; a crank-shaft; springs mounted on said main frame and connected to said popper-box-carrying frame; connecting-rods for said springs and said crank-shaft; and vibrating springs mounted on said main frame and connected to said popper-box-carrying frame, for the purpose specified.

8. The combination of a main supporting-frame; a popper-box-carrying frame; pivoted supporting-arms therefor; a popper-box hinged to said carrying-frame at its forward end; a door for said box arranged at its hinged end; angle-iron rests for said popper-box arranged on said carrying-frame; a crank-shaft; springs mounted on said main frame and connected to said popper-box-carrying frame; connecting-rods for said springs and crank-shaft; and vibrating springs mounted on said main frame and connected to said popper-box-carrying frame, for the purpose specified.

9. The combination of a main supporting-frame; a popper-box-carrying frame; pivoted supporting-arms therefor; a popper-box hinged to said carrying-frame at its forward end; forwardly-projecting side rails for said box; a door for said box arranged at its hinged end; a screen carried by the forwardly-projecting side rails of said popper-box for screening the corn as it is delivered therefrom; a chute arranged beneath said screen; a crank-shaft; springs mounted on said main frame and connected to said popper-box-carrying frame; connecting-rods for said springs and said crank-shaft; and vibrating springs mounted on said main frame and connected to said popper-box-carrying frame, for the purpose specified.

10. The combination of a main supporting-frame; a popper-box-carrying frame; pivoted supporting-arms therefor; a popper-box hinged to said carrying-frame at its forward end; a door for said box arranged at its hinged end; a crank-shaft; springs mounted on said main frame and connected to said popper-box-carrying frame; connecting-rods for said springs and crank-shaft; and vibrating springs mounted on said main frame and connected to said popper-box-carrying frame, for the purpose specified.

11. The combination of a main supporting-frame; a popper-box-carrying frame; pivoted supporting-arms therefor; a popper-box hinged to said carrying-frame at its forward end; forwardly-projecting side rails for said box; a door for said box arranged at its hinged end; angle-iron rests for said popper-box arranged on said carrying-frame; a screen carried by the forwardly-projecting side rails of said popper-box for screening the corn as it is delivered therefrom; a chute arranged beneath said screen; a crank-shaft; springs mounted on said main frame and connected to said popper-box-carrying frame, and connecting-rods for said springs and said crank-shaft, for the purpose specified.

12. The combination of a main supporting-frame; a popper-box-carrying frame; pivoted supporting-arms therefor; a popper-box hinged to said carrying-frame at its forward end; a door for said box arranged at its hinged end; angle-iron rests for said popper-box arranged on said carrying-frame; a crank-shaft; springs mounted on said main frame and connected to said popper-box-carrying frame; and connecting-rods for said springs and crank-shaft, for the purpose specified.

13. The combination of a main supporting-frame; a popper-box-carrying frame; pivoted supporting-arms therefor; a popper-box hinged to said carrying-frame at its forward end; forwardly-projecting side rails for said box; an upwardly-opening door for said box arranged at its hinged end; a pulley mounted to the rear end of door; a cord arranged over said pulley connected to said door and to said box-carrying frame; a screen carried by the forwardly-projecting side rails of said popper-box for screening the corn as it is delivered therefrom; a chute arranged beneath said screen; means for reciprocating said popper-box-carrying frame; and vibrating springs mounted on said main frame and connected to said popper-box-carrying frame, for the purpose specified.

14. The combination of a main supporting-frame; a popper-box-carrying frame; pivoted supporting-arms therefor; a popper-box hinged to said carrying-frame at its forward end; an upwardly-opening door for said box arranged at its hinged end; a pulley mounted to the rear of said door; a cord arranged over said pulley connected to said door and to said box-carrying frame; means for reciprocating said popper-box-carrying frame; and vibrating springs mounted on said main frame and connected to said popper-box-carrying frame, for the purpose specified.

15. The combination of a main supporting-frame; a popper-box-carrying frame; pivoted supporting-arms therefor; a popper-box hinged to said carrying-frame at its forward end; forwardly-projecting side rails for said box; an upwardly-opening door for said box arranged at its hinged end; a pulley mounted to the rear of said door; a cord arranged over said pulley connected to said door and to said box-carrying frame; a screen carried by the forwardly-projecting side rails of said popper-box for screening the corn as it is delivered therefrom; a chute arranged beneath said screen; and means for reciprocating said popper-box-carrying frame, for the purpose specified.

16. The combination of a main supporting-frame; a popper-box-carrying frame; pivoted supporting-arms therefor; a popper-box hinged to said carrying-frame at its forward end; an upwardly-opening door for said box arranged at its hinged end; a pulley mounted to the rear of said door; a cord arranged over said pulley connected to said door and to said box-carrying frame; and means for reciprocating said popper-box-carrying frame, for the purpose specified.

17. The combination of a supporting-frame; a popper-box-carrying frame; pivoted supporting-arms therefor; a popper-box hinged to said carrying-frame at its forward end; forwardly-projecting side rails for said box; an upwardly-opening door for said box arranged at its hinged end; a latch for said door, consisting of a pair of sliding bolts, a pivoted latch-lever, and links connecting said bolts to said lever; a pulley mounted at the rear of said door; a cord arranged over said pulley secured to said latch-lever and to said box-carrying frame; a screen carried by the forwardly-projecting side rails of said popper-box for screening the corn as it is delivered therefrom; a chute arranged beneath said screen; and a handle for said popper-box, for the purpose specified.

18. The combination of a supporting-frame; a popper-box-carrying frame; pivoted supporting-arms therefor; a popper-box hinged to said carrying-frame at its forward end; an upwardly-opening door for said box arranged at its hinged end; a latch for said door, consisting of a pair of sliding bolts, a pivoted latch-lever, and links connecting said bolts to said lever; a pulley mounted at the rear of said door; a cord arranged over said pulley secured to said latch-lever and to said box-carrying frame; and a handle for said popper-box, for the purpose specified.

19. The combination of a frame; a popper-box arranged to be tilted; an upwardly-opening door for said box arranged at its forward end; a latch for said door, consisting of a pair of sliding bolts, a pivoted latch-lever, and links connected to said bolts and to said lever; a pulley mounted at the rear of said door; and a cord arranged over said pulley, secured to said latch-lever, whereby said door is automatically opened by the tilting of said box, for the purpose specified.

20. The combination of a frame; a popper-box arranged to be tilted; an upwardly-opening door for said box arranged at its forward end; a pulley mounted at the rear of said door; and a cord arranged over said pulley, secured to said door, whereby said door is automatically opened by the tilting of said box, for the purpose specified.

21. The combination of a supporting-frame; a reciprocatingly-supported popper-box; a crank-shaft; springs mounted on said main frame and connected to said popper-box; connecting-rods for said springs and crank-shaft; and vibrating springs mounted on said main frame and connected to said popper-box, for the purpose specified.

22. The combination of a frame; a popper-box arranged to be tilted; a door for said box; and connections for said door to said frame whereby said door is automatically opened when said box is tilted, for the purpose specified.

23. The combination of a frame; a popper-box; a crank-shaft; springs connected to said popper-box and to said crank-shaft; and vibrating springs connected to said frame and to said popper-box, for the purpose specified.

In witness whereof I have hereunto set my hand and seal in presence of two witnesses.

WILLIAM RYAN. [L. S.]

Witnesses:
  PATRICK RYAN,
  F. C. MARLOW.